A. BISCHOFF.
PULLEY-BLOCKS.
No. 194,326.          Patented Aug. 21, 1877.
Fig: 1.          Fig: 2.
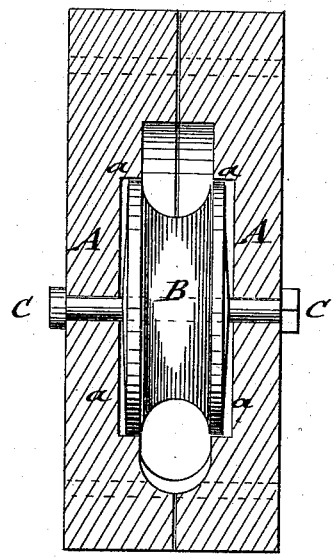
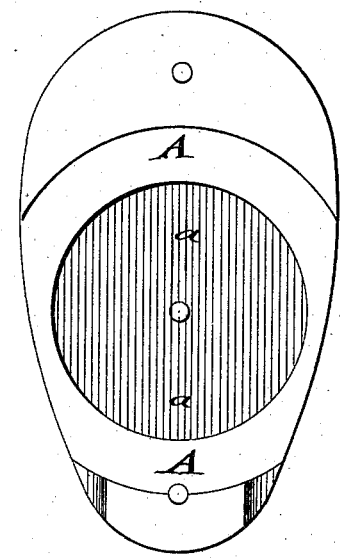
WITNESSES:          INVENTOR:

UNITED STATES PATENT OFFICE.

ANTON BISCHOFF, OF NEW YORK, N. Y., ASSIGNOR TO HIMSELF AND FREDERICK BURGER, OF SAME PLACE.

IMPROVEMENT IN PULLEY-BLOCKS.

Specification forming part of Letters Patent No. 194,326, dated August 21, 1877; application filed August 3, 1877.

*To all whom it may concern:*

Be it known that I, ANTON BISCHOFF, of the city, county, and State of New York, have invented a new and Improved Pulley-Block, of which the following is a specification:

In the accompanying drawing, Figure 1 represents a vertical transverse section of my improved pulley-block for clothes-lines, and Fig. 2 an exterior view of one of the cheeks of the block.

Similar letters of reference indicate corresponding parts.

The invention is intended to furnish an improved pulley-block for clothes-lines, by which the annoying wedging in of the lines between pulley and cheek of block is fully avoided and a reliably-working pulley-block obtained; and the invention consists of a pulley-block having cheeks with interior circular recesses fitting over the rims or flanges of the pulleys.

In the drawing, A represents the cheeks of my improved pulley-block, which are connected in any approved manner, so as to form a strong and substantial block. The pulley B revolves on a fixed shaft, C, and projects, by its flanges or rims, into circular recesses $a$ at the inner sides of the cheeks, which recesses extend in such a manner around the pulley that any possibility of wedging in the clothes-line between block and pulley is entirely avoided.

The pulley plays freely and easily within the additional space formed by the recesses of the cheeks, and overcomes one of the most serious and annoying objections to the various pulley-blocks now in use.

Having thus fully described my invention, I claim as new and desire to secure by Letters Patent—

A pulley-block for clothes-lines, made with circular recesses at the inner faces of the cheeks, the recesses extending around the flanges of the pulley to prevent wedging of clothes-lines, substantially as specified.

ANTON BISCHOFF.

Witnesses:
PAUL GOEPEL,
C. SEDGWICK.